3,326,697
FLAVOR ENHANCER IN A LIQUID FORM

Hirao Shimazono, Nishinomiya, Katsuharu Yasumatsu, Ikeda, Chikashi Matsumura, Kyoto, and Kumiko Jōno, Osaka, Japan, assignors to Takeda Chemical Industries, Ltd., Osaka, Japan
No Drawing. Filed Mar. 15, 1963, Ser. No. 265,330
Claims priority, application Japan, Mar. 17, 1962, 37/10,764
4 Claims. (Cl. 99—140)

The present invention relates to a flavor enhancer in a liquid form, which contains one or more kinds of flavoring components and an aqueous solution of polyhydric alcohol in a relatively high concentration.

In addition to monosodium glutamate which has long been used widely as a flavoring component, sodium 5'-inosinate and sodium 5'-guanylate have recently come to enjoy popularity for enhancement of taste of various foods as well as of seasonings including spices and sauces.

Such flavoring components as mentioned above are usually in the form of crystal, powder or granule, which is rather inconvenient to enable them completely dissolve into such a seasoning as above for preparing a preservative liquid seasoning containing one or more kinds of such flavoring components, because of their sparing solubility in seasonings as above.

A preservative liquid seasoning containing one or more kinds of such flavoring components will surely make it more convenient for enhancement of taste of foods which are served in non-liquid state, e.g. fresh vegetable, cold meat, etc.

Besides, there have recently appeared several kinds of seasonings in the form of aerosol, and flavoring components as mentioned above are also desired to be used in this form, which makes the sprinkling of such flavoring components on foodstuff more convenient.

To provide such aerosol-type flavor enhancers, the flavor enhancers must be in a liquid state and preservable for a long time.

Although many attempts have been made to realize the liquid flavor enhancers, none of them, as far as the present inventors are aware, has been entirely successful for production on an industrial scale.

For successfully answering this purpose, choice of the solvent used is an important factor. As prerequisites for the applicable solvents, there may be enumerated non-toxicity and non-offensive odor, and even if some solvents satisfy the requirements, the following problems must be also taken into consideration;

(i) Putrefaction in storage,
(ii) Deposit of crystal of flavoring components.

The foregoing two problems are closely related to each other as referred to hereinafter.

Generally, as solute increases its content in the solution, microorganisms in the solution become extinct by the osmotic pressure, and therefore, if avoidance of putrefaction is the sole purpose, it will be only the prerequisite therefor to increase the content of solute as highly as possible. For instance, monosodium glutamate solution having more than 40% concentration may be sufficient for preventing same from putrefaction.

It, however, engenders another problem in that the crystal of the solute is apt to deposit during preservation of the solution, when the concentration of the solution is so high, resulting in not only inferior appearance but also heterogeneous taste. Deposit of such crystal will also bring the fear of putrefaction possibly caused by the low concentration resulting from the depositing of the crystal.

Sodium chloride is often added to foodstuff for preventing in from putrefaction, but this is not suitable in view of the object as a flavor enhancer, and actually, growth of bacteria can not be perfectly controlled even if such flavor enhancers contain about 20% of sodium chloride. It seems that a chemical preservative may be applicable if the object lies in only prevention against putrefaction, but it is not advisable to add a large quantity of a chemical preservative in a flavor enhancer which may be used almost every day. Moreover, it will become clear by the following Experiment 1 that prevention against putrefaction and check of depositing crystals can not be accomplished solely by means of a chemical preservative. Experiment 1 shows that sorbic acid, one of the least toxic chemical preservatives, can not completely inhibit the denaturalization of aqueous solution of monosodium glutamate.

EXPERIMENT 1. — PRESERVATIVE EFFECT OF SORBIC ACID AGAINST SODIUM GLUTAMATE SOLUTION

Aqueous solutions having the following composition are prepared:

Concentration of monosodium glutamate (percent): 10, 15, 20, 25, 30, 35
Concentration of sorbic acid (percent): 0, 0.10, 0.15, 0.20
pH of the solution: 5.4, 5.7, 6.0

The following microorganisms were inoculated into the solutions and the inoculated solutions were kept at 33° C., and then observed after one month.

Microorganisms inoculated:

Bacteria—
 Bacillus subtilis
 Staphylococcus aureus
 Pseudomonas aeruginosa
 Escherichia coli
Mold—
 Aspergillus niger
 Penicillium citrinum
 Mucor spinescens
Yeast—Zygosaccharomyces japonicus Observation: The state of the solutions was observed after standing of the solutions at 0° C. for one month in a refrgerator. In the following Table 1, the solution in which the deposit of crystal or the putrefaction was observed was denoted by (+), and the solution in which the deposit of crystal or putrefaction was not observed was denoted by (−).

TABLE 1

| pH | SA (percent) | MSG (percent) 10 Putrefaction | Deposit of crystal | 15 Putrefaction | Deposit of crystal | 20 Putrefaction | Deposit of crystal | 25 Putrefaction | Deposit of crystal | 30 Putrefaction | Deposit of crystal | 35 Putrefaction | Deposit of crystal |
|---|---|---|---|---|---|---|---|---|---|---|---|---|---|
| 6 | 0 | + | − | + | − | + | − | + | − | + | − | + | + |
|   | 0.1 | + | − | + | − | + | − | + | − | + | − | + | + |
|   | 0.15 | + | − | + | − | + | − | + | − | + | − | + | + |
|   | 0.20 | + | − | + | − | + | − | + | − | + | − | − | + |
| 5.7 | 0 | + | − | + | − | + | − | + | − | + | + | + | + |
|   | 0.10 | + | − | + | − | + | − | + | − | − | + | − | + |
|   | 0.15 | + | − | + | − | + | − | + | − | − | + | − | + |
|   | 0.20 | + | − | + | − | + | − | + | − | − | + | − | + |
| 5.4 | 0 | + | + | + | + | + | + | + | + | − | + | − | + |
|   | 0.10 | − | + | − | + | − | + | − | + | − | + | − | + |
|   | 0.15 | − | + | − | + | − | + | − | + | − | + | − | + |
|   | 0.20 | − | + | − | + | − | + | − | + | − | + | − | + |

In the above-mentioned table, MSG and SA signify monosodium glutamate and sorbic acid, respectively.

Indispensable condition for overcoming the foregoing defects is to employ a suitable solvent which can well dissolve flavoring components and prevent the solution from putrefaction.

The present invention provides a group of solvents which satisfy the above-mentioned requirements.

Among the polyhydric alcohols which can conveniently be used for the liquid flavor enhancers in the present invention, there may, for example, be enumerated sorbitol, mannitol, dulcitol, glycerol and glucose.

These alcohols may be used solely or in the mixture of two or more thereof.

An aqueous solution of polyhydric alcohol in a relatively high concentration employed in the present invention has an effect not only for prevention against putrefaction but also for preventing deposit of crystal even at low temperature.

Experiment 2 shows the state of putrefaction and deposit of crystals of monosodium glutamate in an aqueous solution of sorbitol in a high concentration.

EXPERIMENT 2

Aqueous solutions having the following compositions are prepared.

Concentration of sorbitol (percent): 0, 30, 40
Concentration of sorbic acid (percent): 0, 0.2
Concentration of monosodium glutamate (percent): 20, 35

Microorganisms used in Experiment 1 were inoculated into the solutions, and so inoculated solutions were kept at 33° C. for one month, then the change of the solution —the deposit of crystal and growth of the microorganisms —was observed.

In the following Table 2, the solution in which the deposit of crystal or putrefaction was observed was denoted by (+), and the solution in which the deposit of crystal or putrefaction was not observed was denoted by (−).

Result:

TABLE 2

| SL (percent) | MSG (percent) 20 SA (percent) 0 Putrefaction | Deposit of crystal | 0.2 Putrefaction | Deposit of crystal | 35 SA (percent) 0 Putrefaction | Deposit of crystal | 0.2 Putrefaction | Deposit of crystal |
|---|---|---|---|---|---|---|---|---|
| 0  | + | + | + | + | + | + | − | + |
| 30 | + | − | + | − | + | − | − | − |
| 40 | + | − | − | − | − | − | − | − |

In the above-mentioned table, MSG, SA and SL designate monosodium glutamate, sorbic acid and sorbitol, respectively.

The concentration of polyhydric alcohols used in the present invention varies as the kinds of polyhydric alcohol and as the kind and amount of flavoring components. However, in the case that sorbitol or glucose is employed, the concentration of about 20–80%, preferably about 35–60% is desirable, and in the case that glycerol is employed, the concentration of about 40–80% is preferable.

In the case that glucose is used as a polyhydric alcohol, a coloration-inhibitor such as sulfites may be added to the solutions for preventing coloration caused by pasteurization or a long storage.

The liquid flavor enhancer of this invention may contain various flavoring components, which may be exemplified by flavoring materials originated from ribonucleic acid or its related substances such as the respective alkali salts of 5'-ribonucleotides e.g. 5'-inosinic acid and/or 5'-guanylic acid, or alkali salts of amino acids. The 5'-ribonucleotides may be 5'-inosinic acid, 5'-guanylic acid, 5'-xanthylic acid, or their mixture, and the amino acids may be glutamic acid or homocysteinic acid. Among these a mixture of the respective sodium salts of 5'-inosinic acid and 5'-guanylic acid, or mono-sodium glutamate of their mixture is most preferably employed. For dissolving these flavoring components, a thick aqueous solution of sorbitol or mannitol is rather suitable, because these are not so sweet and therefore only the flavor enhancing activity can be imparted to the dishes. As the other flavoring components, there may be included an organic acid or its alkali salts such as acetic acid, lactic acid, succinic acid, citric acid, malic acid, fumalic acid, ascorbic acid or the like. The alkali salts of these organic acids often act as one of the flavor enhancers. Moreover, when the flavor enhancers, amino acids, and organic acids are mixedly employed, the mixture often exhibits more delicious flavor than the sole use of any of them. Such a flavor enhancing effect can be remarkably observed between sodium 5'-inosinate and sodium 5'-guanylate, between sodium 5'-inosinate and monosodium glutamate, between sodium 5'-guanylate and monosodium glutamate or among sodium 5'-inosinate, sodium 5'-guanylate and monosodium glutamate.

Sodium salts of 5'-ribonucleotides are usually mixedly obtainable from ribonucleic acid, and the mixture may be used as such for the flavor enhancer to be comprised in the liquid flavor enhancer of this invention.

Other than the above examples, various flavoring components, nutrients or the like may be employed as the components of the liquid flavor enhancer of this invention so long as they can dissolve or can disperse in the thick aqueous solution of polyhydric alcohols. Namely, sodium chloride, spices, soup flavor, polyphosphates, vitamins or fruit essences may be contained solely or in combination with others. Or, as occasion demands, sweetening agents such as saccharin, cyclamates or the like may be added. In such a case, sucrose, glucose, fructose or the like is suitably employed as the polyhydric alcohol.

Thus obtained liquid flavor enhancer of the present invention can be applied to a wide range of dishes, and can be preserved for a long time without deposit of crystal and putrefaction, and moreover they are very convenient for use because of the liquid form.

In the following examples, a flavoring component called "sodium 5'-ribonucleotides" means a mixture of nearly the same quantity of sodium 5'-inosinate and sodium 5'-guanylate, which is obtained through an enzymatic hydrolysis of ribonucleic acid followed by per se known manner to separate purine nucleotides, the enzymatic hydrolysis being carried out by using an enzyme-containing culture filtrate of microorganism, e.g. *Streptomyces aureus*. Thus, the "sodium 5'-ribonucleotides" may be contaminated with some other 5'-ribonucleotides such as 5'-xanthylic acid, 5'-uridylic acid, 5'-cytidylic acid or the like.

*Example 1*

To 350 grams of monosodium glutamate and 400 grams of sorbitol, water is added to make the total volume to 1 liter, and then the solution is put into a sterilized bottle.

*Example 2*

To a mixture of 322 grams of monosodium glutamate, 28 grams of sodium salt of 5'-ribonucleotide and 400 grams of sorbitol, water is added to make the total volume to 1 liter, and then the solution is put into a bottle, followed by sterilization at 100° C. for 5 minutes.

*Example 3*

To a mixture of 322 grams of monosodium glutamate, 28 grams of sodium salt of 5'-ribonucleotide, 400 grams of glucose, 800 milligrams of sodium hyposulfite and 20 grams of sodium chloride, water is added to make the total volume to 1 liter, and then the solution is put into a bottle, followed by sterilization at 100° C. for 5 minutes.

*Example 4*

To a mixture of 322 grams of monosodium glutamate, 28 grams of sodium salt of 5'-ribonucleotide, 400 grams of sorbitol, 1 gram of soup flavor and 2 grams of sodium chloride, water is added to make the total volume to 1 liter.

*Example 5*

To a mixture of 10 grams of sodium citrate, 70 grams of ascorbic acid, 10 grams of fumaric acid and 500 grams of sorbitol, water is added to make the total volume to 1 liter, and then the solution is put into a bottle, followed by sterilization at 100° C. for 5 minutes.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A flavor enhancer in a liquid form which consists essentially of 5'-mononucleotides, monosodium glutamate, and an aqueous solution of sorbitol, the concentration of the sorbitol in the enhancer being in the range from 35 to 60% by weight.

2. The flavor enhancer as claimed in claim 1, wherein the 5'-mononucleotides are sodium salts of 5'-ribonucleotide.

3. The flavor enhancer as claimed in claim 1, wherein the 5'-mononucleotides are sodium salts of 5'-inosinic acid.

4. The flavor enhancer as claimed in claim 1, wherein the 5'-mononucleotides are sodium salts of 5'-guanylic acid.

References Cited

UNITED STATES PATENTS

| | | | |
|---|---|---|---|
| 2,422,145 | 6/1947 | Taylor | 99—140 |
| 2,629,665 | 2/1953 | Gordon | 99—141 |
| 2,876,107 | 3/1959 | Jucaitis et al. | 99—141 |
| 3,104,171 | 9/1963 | Sakaguchi et al. | 99—140 |
| 3,156,569 | 11/1964 | Griffin et al. | 99—140 |

A. LOUIS MONACELL, *Primary Examiner.*

BEATRICE H. STRIZAK, *Examiner.*

A. E. TANENHOLTZ, *Assistant Examiner.*